(12) United States Patent
Torres et al.

(10) Patent No.: US 12,554,335 B2
(45) Date of Patent: Feb. 17, 2026

(54) INFORMATION HANDLING SYSTEM ASSYMETRIC DISPLAY FOLD TO SUPPORT AN ADAPTIVE KEYBOARD ROW

(71) Applicant: Dell Products L.P., Round Rock, TX (US)

(72) Inventors: Christopher A. Torres, San Marcos, TX (US); Anthony J. Sanchez, Pflugerville, TX (US); Brandon J. Brocklesby, Pflugerville, TX (US); Dong Chul Kang, Cedar Park, TX (US); Yongook Guack, Leander, TX (US); Nicholas G. DiLoreto, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/428,666

(22) Filed: Jan. 31, 2024

(65) Prior Publication Data

US 2025/0244832 A1 Jul. 31, 2025

(51) Int. Cl.
*G06F 3/02* (2006.01)
*G06F 1/16* (2006.01)
*G06F 3/044* (2006.01)

(52) U.S. Cl.
CPC .......... *G06F 3/0219* (2013.01); *G06F 1/1681* (2013.01); *G06F 3/021* (2013.01); *G06F 3/044* (2013.01)

(58) Field of Classification Search
CPC ...... G06F 3/0219; G06F 1/1681; G06F 3/021; G06F 3/044
See application file for complete search history.

(56) References Cited

U.S. PATENT DOCUMENTS

| | | | |
|---|---|---|---|
| 8,674,941 B2 | 3/2014 | Casparian et al. | |
| 9,804,733 B2 | 10/2017 | Walline et al. | |
| 10,331,174 B2* | 6/2019 | Dreessen | G06F 1/1673 |
| 11,079,849 B1* | 8/2021 | Knoppert | G06F 3/0219 |
| 11,106,314 B2 | 8/2021 | Krishnakumar et al. | |
| 11,237,598 B2 | 2/2022 | Seibert et al. | |
| 11,335,295 B1* | 5/2022 | Hirakawa | G09G 3/3677 |

(Continued)

OTHER PUBLICATIONS

Harding, S., "Review: Dell's XPS 13 Plus pulls high performance from a frustrating design," downloaded from https://arstechnica.com/gadgets/2022/09/review-dells-xps-13-plus-pulls-high-performance-from-a-frustrating-design/ on Jan. 25, 2024, 6 pages.

(Continued)

*Primary Examiner* — William Lu
(74) *Attorney, Agent, or Firm* — Zagorin Cave LLP; Robert W. Holland

(57) ABSTRACT

A portable information handling system couples a flexible display film to a housing lid portion and across a hinge to a housing main portion where the flexible display film couples to a timing controller under a mechanical keyboard coupled to the housing main portion. A touch function row presented at the flexible display film between the hinge and mechanical keyboard accepts function key inputs. Mechanical keys coupled in a row over the flexible display film accept input as depressions detected by a touch detection surface of the flexible display film, switches disposed under the flexible display film or a membrane board disposed over the flexible display film.

20 Claims, 14 Drawing Sheets

(56) References Cited

U.S. PATENT DOCUMENTS

| | | | | |
|---|---|---|---|---|
| 11,462,194 | B1* | 10/2022 | Wang | G06F 1/165 |
| 2005/0110784 | A1* | 5/2005 | Kang | G09G 5/006 |
| | | | | 345/204 |
| 2007/0205971 | A1* | 9/2007 | Bae | G09G 5/18 |
| | | | | 345/87 |
| 2011/0273441 | A1* | 11/2011 | Shin | H04N 13/341 |
| | | | | 345/419 |
| 2012/0200503 | A1* | 8/2012 | Berenger | G06F 3/04886 |
| | | | | 345/168 |
| 2013/0222438 | A1* | 8/2013 | Shin | H04N 13/341 |
| | | | | 345/214 |
| 2017/0068349 | A1* | 3/2017 | Kim | G06F 3/044 |
| 2017/0068388 | A1* | 3/2017 | Kim | G06F 3/044 |
| 2017/0075445 | A1* | 3/2017 | Kyowski | G06F 3/0202 |
| 2017/0212636 | A1* | 7/2017 | Kim | G09G 3/2092 |
| 2017/0300089 | A1* | 10/2017 | Hampton | G06F 1/1616 |
| 2017/0315669 | A1* | 11/2017 | Oh | G06F 3/045 |
| 2018/0052527 | A1* | 2/2018 | Serra-Martin | G06F 3/0236 |
| 2018/0059740 | A1* | 3/2018 | Kato | E05D 3/06 |
| 2018/0088748 | A1* | 3/2018 | Ozer | G06F 3/0481 |
| 2018/0210504 | A1* | 7/2018 | Moser | G06F 1/1679 |
| 2018/0218859 | A1* | 8/2018 | Ligtenberg | H01H 13/85 |
| 2019/0250817 | A1* | 8/2019 | Chu | G06F 1/1662 |
| 2020/0225711 | A1* | 7/2020 | Pelissier | G06F 1/1624 |
| 2020/0233538 | A1* | 7/2020 | Aurongzeb | G06F 1/166 |
| 2020/0349895 | A1* | 11/2020 | Files | G09G 3/20 |
| 2021/0034109 | A1* | 2/2021 | Torres | G06F 1/1616 |
| 2021/0124427 | A1* | 4/2021 | Choate | G06F 3/0219 |
| 2021/0132769 | A1* | 5/2021 | Parikh | G06N 3/09 |
| 2022/0114126 | A1* | 4/2022 | Nelson | G06F 1/3293 |
| 2022/0131105 | A1* | 4/2022 | Files | G06F 1/1637 |
| 2022/0236777 | A1* | 7/2022 | Andrews | G06F 1/1677 |
| 2022/0382430 | A1* | 12/2022 | Xu | G06F 3/0219 |
| 2022/0399172 | A1* | 12/2022 | Bharadwaj | H01H 13/704 |
| 2023/0185332 | A1* | 6/2023 | Morrison | G06F 11/3093 |
| | | | | 361/679.1 |
| 2023/0244335 | A1* | 8/2023 | Lin | G06F 3/0412 |
| | | | | 345/173 |

OTHER PUBLICATIONS

Macos User Guide, "Use the Touch Bar on Mac," downloaded from https://support.apple.com/guide/mac-help/use-the-touch-bar-mchlbfd5b039/mac on Jan. 25, 2024, 4 pages.

The Verge, "Dell XPS 13 Plus hands-on: is that . . . a touch bar?," downloaded from https://www.theverge.com/2022/1/4/22865547/dell-xps-13-plus-2022-hands-on-new-design-features on Jan. 25, 2024, 8 pages.

* cited by examiner

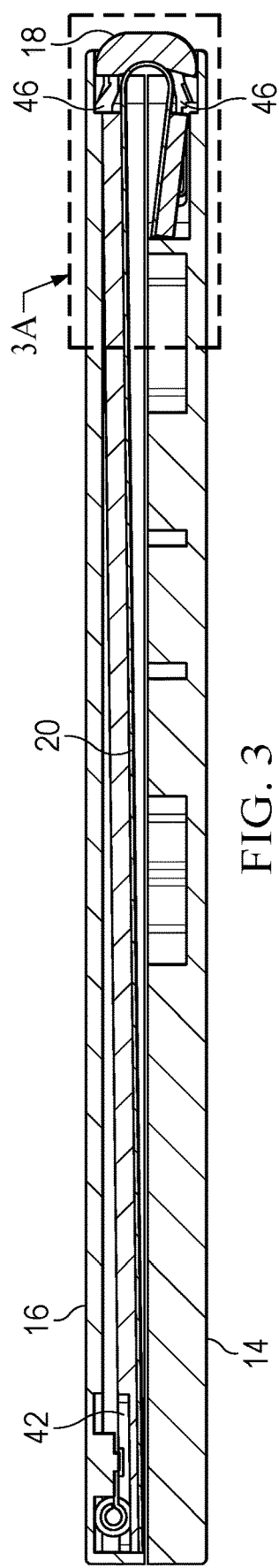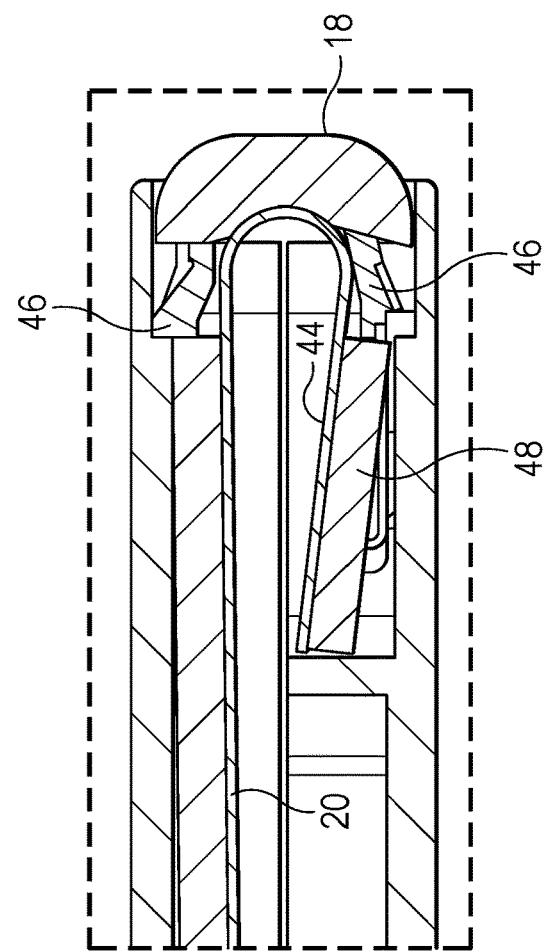
FIG. 3
FIG. 3A

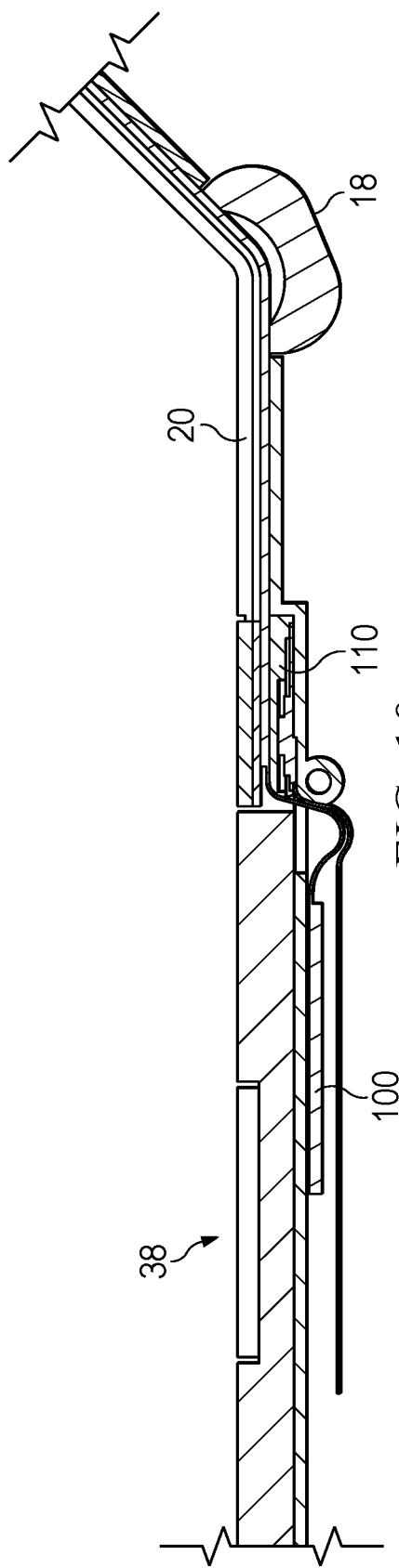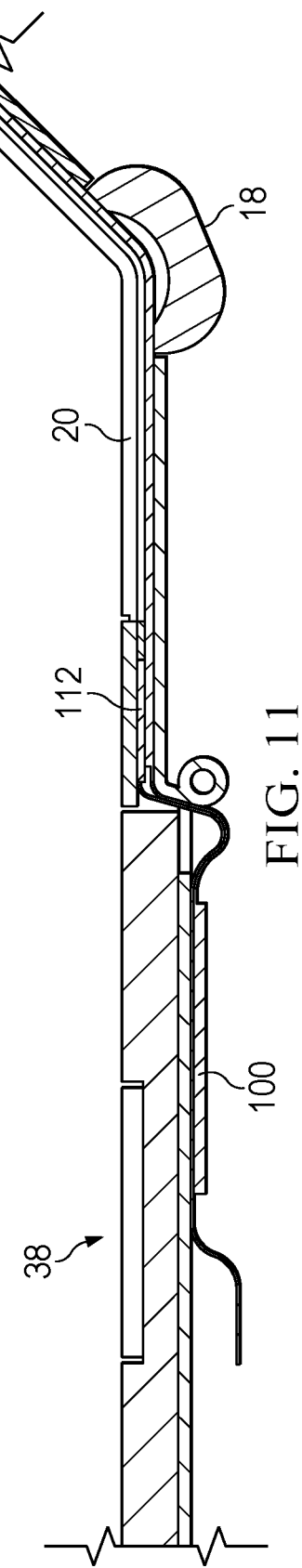

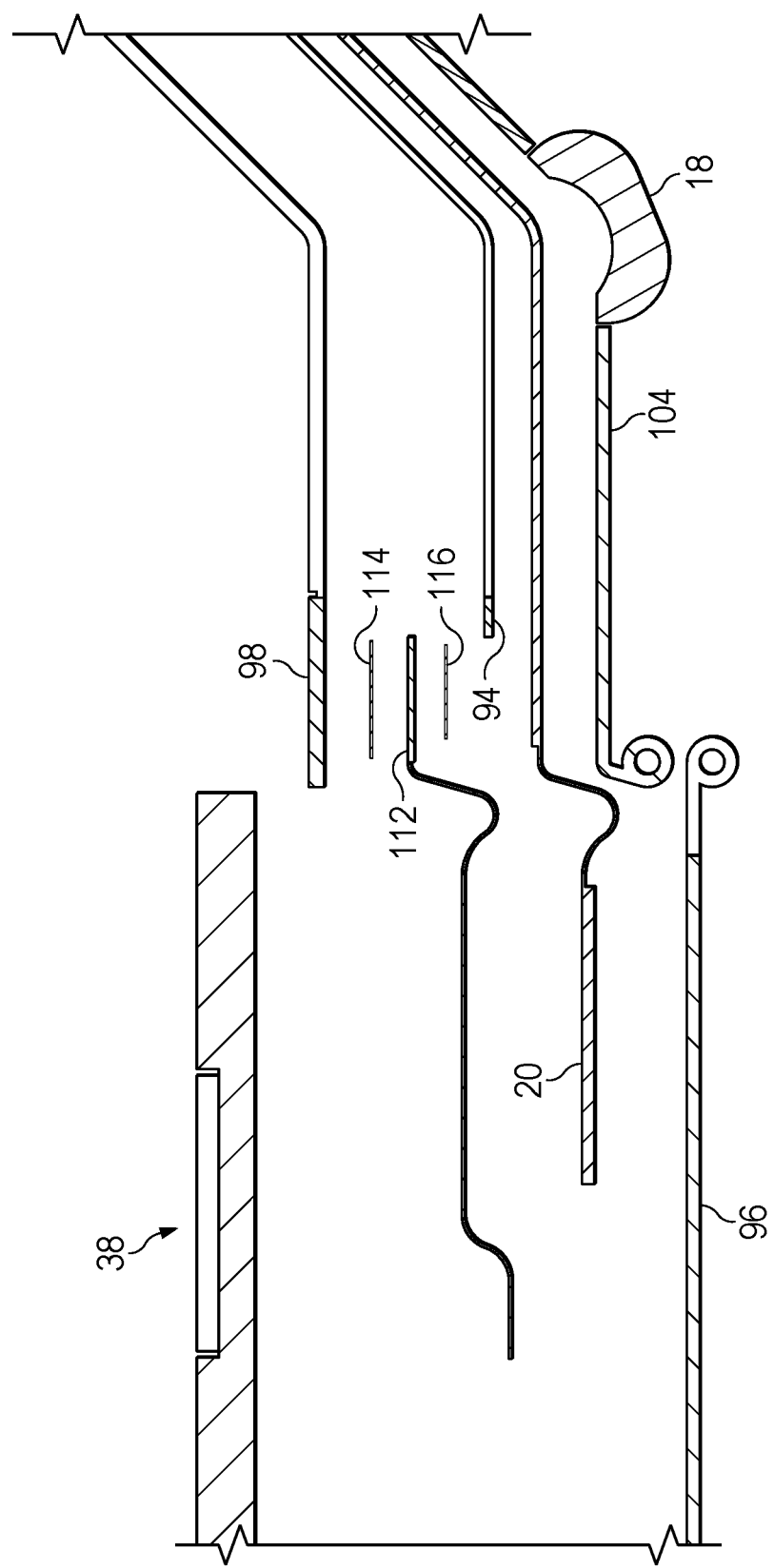

INFORMATION HANDLING SYSTEM ASSYMETRIC DISPLAY FOLD TO SUPPORT AN ADAPTIVE KEYBOARD ROW

BACKGROUND OF THE INVENTION

Field of the Invention

The present invention relates in general to the field of portable information handling systems, and more particularly to an information handling system asymmetric display fold to support an adaptive keyboard row.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One advantage of convertible information handling systems is that they include mechanical keys in the keyboard with vertical travel that provides positive feedback to end users when a key input is made by a key press. Mechanical keys tend to be more user friendly in that end users can type at full speeds similar to when using peripheral keyboards, in contrast with virtual keyboards that are presented at a display as a visual image and that detect inputs with touches to a touch detection screen, such as with a capacitive touch sensor. One technique to improve inputs with virtual keys is to provide haptic feedback when an input is performed, such as by a piezoelectric or other vibration source below the key value on the display. While somewhat helpful, the feedback is generally less useful than that of vertical travel of a mechanical key and sometimes difficult to isolate to a particular location at a keyboard where a key is pressed. A disadvantage of convertible information handling system keyboards is that the size of the keys and the amount of vertical travel are typically reduced due to the small size of the portable housing. This can mean hunting and pecking at keys to perform inputs, particularly with unfamiliar key input values, such as numbers in a number row of a conventional QWERTY keyboard or functions in a function row at the upper top row of keys in a typical information handling system keyboard.

The function row of keys generally has an escape at the far left and then function keys F1 through F12. Some arrangements will have insert and delete keys to the far right, others in smaller sized housings might include fewer function keys, such as F1 through F9. In addition, each function key also can have a toggle or submenu secondary function that is commanded when the function is not selected. For instance, display, keyboard backlight, speaker, microphone and audiovisual controls may be included on function keys. A speaker toggle key might mute and unmute the speaker when the key is pressed. A difficulty with function key interactions is that an end user typically has to hunt and peck for the correct function key by looking at the keyboard and reading the key value from the function keys of the function key row. This tends to introduce inefficiency due to the time needed to find the right key and also due to the attention of the end user being drawn away from displayed visual images, which breaks down user workflow. Often manufacturers will assign input values to keyboards for the function keys so that memorized workflows might fail as an end user moves between different keyboard configurations.

SUMMARY OF THE INVENTION

Therefore, a need has arisen for a system and method which supports a touch function row presented at a flexible display film that extends from a housing lid portion, across a hinge and adjacent a mechanical keyboard coupled to a housing main portion.

In accordance with the present invention, a system and method are provided which substantially reduce the disadvantages and problems associated with previous methods and systems for accepting inputs at an information handling system. A portable information handling system presents visual images with a flexible display film at a housing lid portion with a part of the flexible display film extending over a hinge and supported by a pivot plate of the housing main portion. The flexible display couples under a mechanical keyboard of the housing main portion to provide space for a timing controller and accepts function key inputs for visually presented touch function row of keys.

More specifically, a portable information handling system process information with a processor and memory coupled in a portable housing having a lid portion rotationally coupled to a main portion by a hinge. A flexible display film interfaces with the processor through a timing controller to present the information as visual images. The flexible display film couples to the lid portion to present visual images at the full lid housing portion and extends across the hinge to adjacent a keyboard coupled to the main portion to present a touch function row between the keyboard and hinge. The hinge includes a pivot plate the rotationally couples by a pivot arm with a hinge bracket so that the pivot plate rotates off axis from an axle of the hinge, thereby managing a curvature radius of the flexible display film. The flexible display film timing controller couples under a mechanical keyboard coupled to the housing main portion. In one embodiment, number keys couple adjacent the keyboard and touch function row presentation to accept number key inputs at a button board or touch detection surface placed above or below the flexible display film.

The present invention provides a number of important technical advantages. One example of an important technical advantage is that a portable information handling system with an integrated mechanical keyboard offers a full keyboard experience including number keys and function keys while reducing the vertical stack of the keyboard at the housing main portion rear side. The reduced vertical stack conserves room to enhance thermal rejection venting out the rear side of the housing and includes other components so that overall housing thickness is reduced. The hinge and pivot plate arrangement supports a fold of a flexible display film having a reduced size at the main housing portion. A timing controller couples to the flexible display film under the mechanical keyboard where the embedded wirelines are hidden for a more efficient and aesthetically pleasing system appearance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3 and 3A depict a side sectional view of the information handling system having a fold of the flexible display film at the hinge when the housing is in a closed position;

FIG. 10 depicts a sectional view of the example embodiment of FIG. 9 assembled;

FIG. 11 depicts a side sectional view of an alternative embodiment of a number key detection with a touch detection surface under the number keys;

FIG. 12 depicts a side assembled view of the embodiment of FIG. 11 having a touch detection surface to detect number key inputs;

DETAILED DESCRIPTION

An information handling system flexible display film extends across a hinge and adjacent a mechanical keyboard with support beneath by a pivot plate and communication of visual images through a timing controller located under the keyboard. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
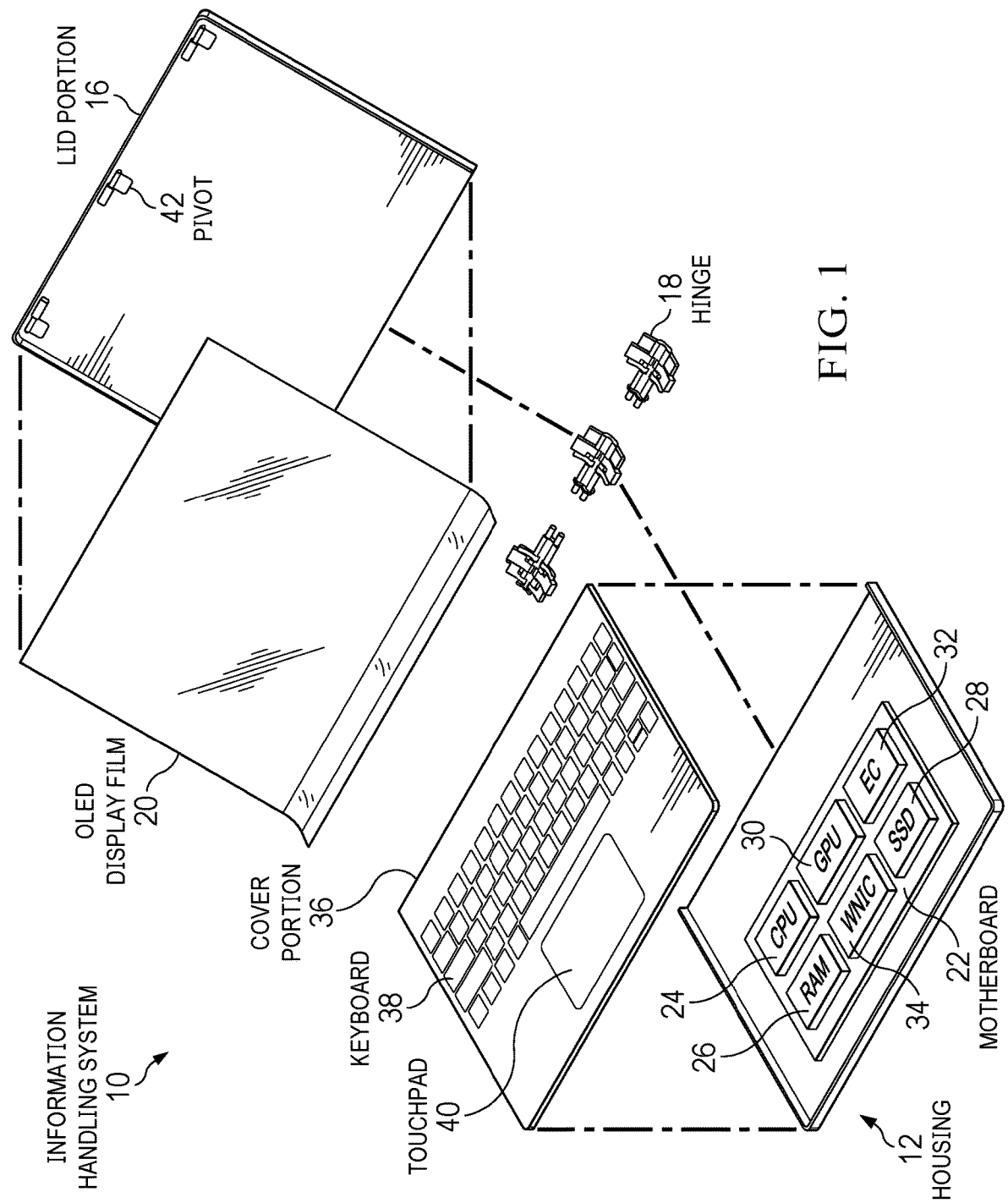
FIG. 1 depicts an exploded perspective view of an information handling system having a flexible display film that extends across a hinge to adjacent a mechanical keyboard.

Referring now to FIG. 1, an exploded perspective view depicts an information handling system 10 having a flexible display film 20 that extends across a hinge 18 to adjacent a mechanical keyboard 38. In the example embodiment, portable information handling system 10 is built in a housing 12 having a main portion 14 rotationally coupled to a lid portion 16 with three hinges 18. An organic light emitting diode (OLED) display film 20 couples over lid portion 16 to present information as visual images with a bottom portion extending over hinges 18 to present a row of visual images at main portion 14. A motherboard 22 coupled in main portion 14 interfaces processing components that cooperate to process information. A central processing unit (CPU) 24 executes instructions to process information in cooperation with a random access memory (RAM) 26 that stores the instructions and information. A solid state drive (SSD) 28 or other types of persistent non-transitory memory stores information during power off states, such as with flash memory integrated circuits. A graphics processing unit (GPU) 30 further processes information to generate pixel values that define visual images at flexible display film 20. An embedded controller 32 manages operating conditions within the housing, such application of power and thermal conditions, and also manages interactions with input/output (I/O) and peripheral devices. A wireless network interface controller (WNIC) 34 supports wireless communications to networks and peripheral devices, such as through WIFI and BLUETOOTH.

In the example embodiment, a housing cover portion 36 couples over main portion 14 to enclose the processing components. A mechanical keyboard 38 has plural mechanical keys that travel vertically to accept end user inputs, such as with presses against an underlying membrane or other sensor. A touchpad 40 accepts touch inputs to control a pointer presented at flexible display film 20. In the example embodiment, one or more of the rows of keys of keyboard 38 are replaced by a presentation of a row of keys at flexible display film 20 where the display film extends from lid portion 16 over hinges 18 and main portion 14. As an example, a touch function row is presented as visual images of keys between keyboard 38 and hinge 18 so that an end user can press on the key images to input the key values. A touch function row replaces the row of function keys, such as escape, F1 through F12, insert and delete keys, with visual images of the keys so that pressed on the keys are detected by a touch detection surface of the flexible display film and reported to embedded controller 32 as the function key input value. Interactions with the touch function row are described in greater depth by U.S. patent application Ser. No. 18/422,271, entitled "Information Handling System Capacitive Touch Function Row with On-Screen-Display User Interface" by Baluch et al., which is incorporated herein as if fully set forth.

Figure 2:
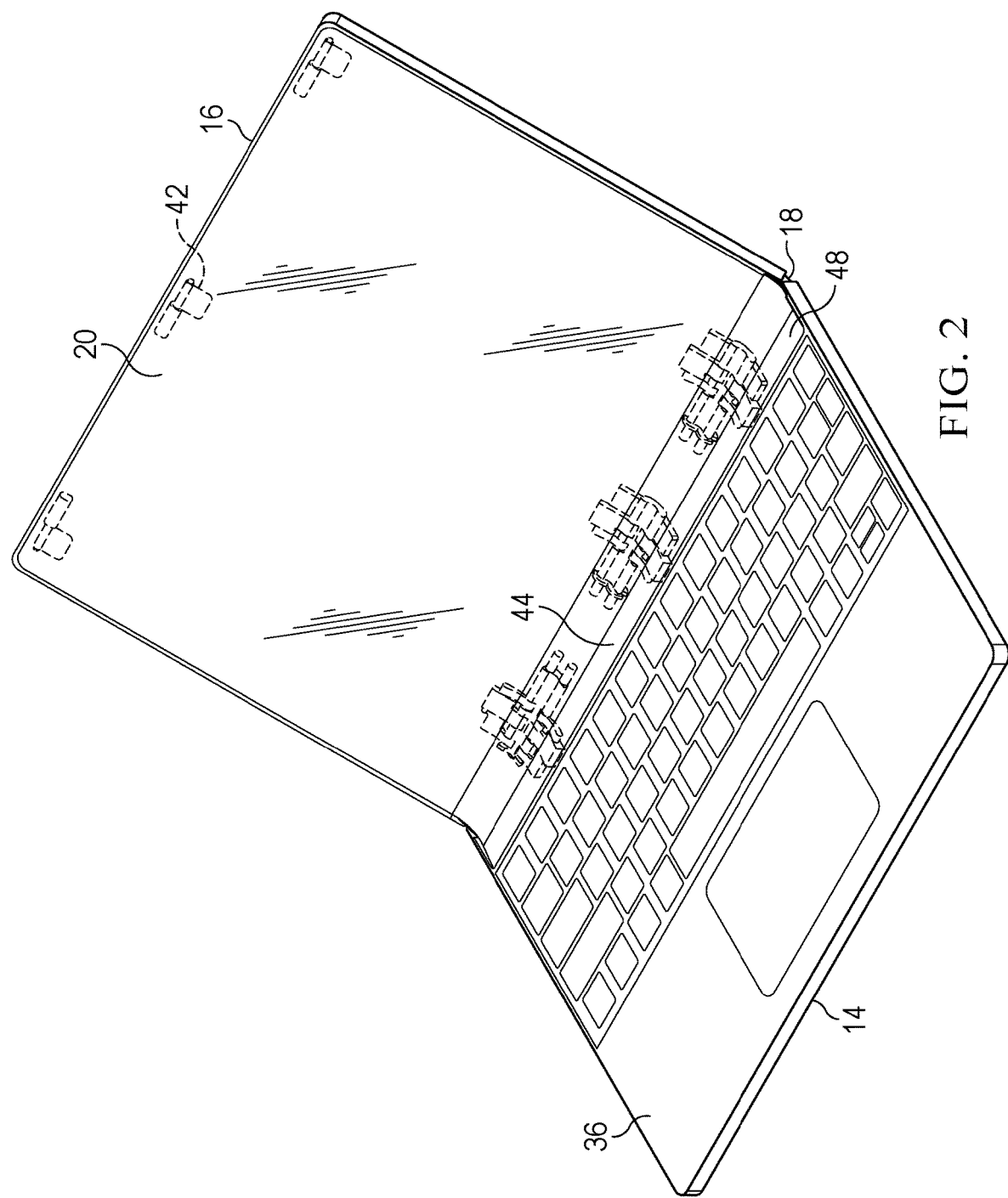
FIG. 2 depicts a front perspective view of a portable information handling system in an open position having a touch function row presented at a flexible display film over a pivot plate.

Referring now to FIG. 2, a front perspective view depicts a portable information handling system 10 in an open position having a touch function row 44 presented at a flexible display film 20 over a pivot plate 48. Lid portion 16 couples flexible display film across the full front surface area to present visual images in a viewing position raised over main portion 14 and cover portion 36 holding the keyboard in a typing position. A set of three synchronized hinges 18 rotate housing lid portion 16 relative to housing main portion 14 and interact with pivot plate 48 to adjust the position of the pivot plate as the housing portions rotate relative to each other. The central hinge 18 is centrally located relative to pivot plate 48 to offer firm support under touch function row 44 when an end user presses down on the visually presented function keys at the folded portion of flexible display film 20. A lid pivot 42 engages at the upper portion of housing lid portion 16 to guide flexible display film 20 during opening and closing of the housing so that the display film can withstand folding forces without failing. At housing main portion 14, flexible display film 20 folds under the keyboard to hide from sight and provide space to couple a timing controller (TCON), as described in greater depth below.

Referring now to FIGS. 3 and 3A, a side sectional view of information handling system 10 depicts a fold of the flexible display film at hinge 18 when the housing is in a closed position. When housing lid portion 16 rotates to the closed position, lid pivots 42 support sliding movement of flexible display film 20 so that stress is not introduced to the fold region shown in the detailed view of FIG. 3A. The area of flexible display film 20 where touch function row 44 is presented rests on pivot plate 48, which rotates inward to housing main portion 14. Pivot arms 46 couple hinge 18 to pivot plate 48 so that hinge rotation translates to a lowering of pivot plate 48 so that a larger fold curvature of flexible display film 20 is provided in the closed position. The greater curvature radius offered to the flexible display film by the inward rotation of the pivot plate reduces the stress placed on the flexible display film when folded in the closed position.

Figure 4:
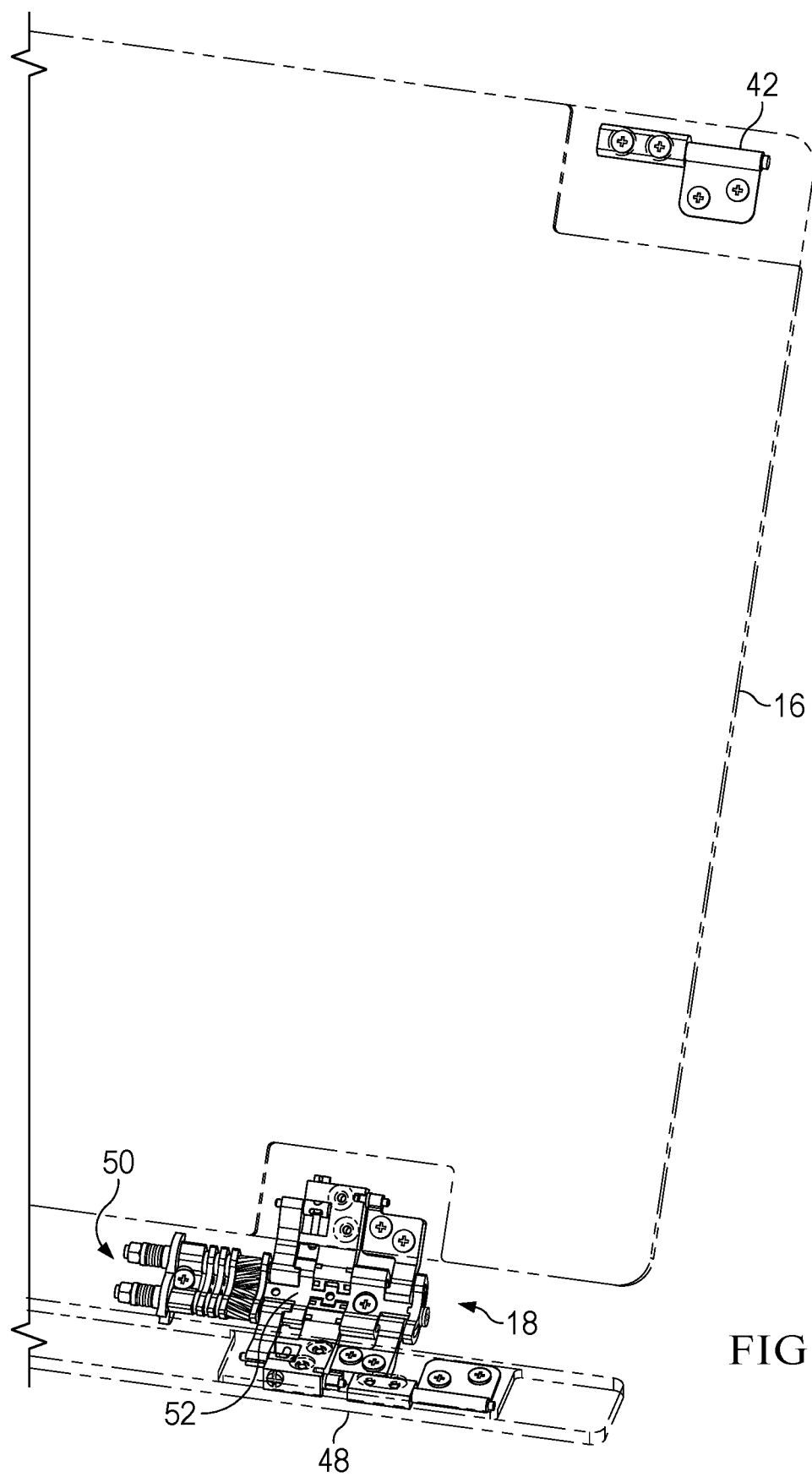
FIG. 4 depicts a transparent front view of an example embodiment of a hinge coupled to a housing portion with a lid pivot to coordinate stress management at a flexible display film during rotation of the housing between closed and open positions.

Referring now to FIG. 4, a transparent front view depicts an example embodiment of a hinge 18 coupled to a housing portion with a lid pivot 42 to coordinate stress management at a flexible display film during rotation of the housing between closed and open positions. Hinge 18 includes a gear assembly 50 that provides synchronized rotation of axles that couple with a hinge body 52 to lid portion 16 and a main portion. Hinge body 52 couples to pivot plate 48 to translate rotation of the hinge axles into movement of pivot plate 48 and lid pivot 42 so that changes in the shape of the flexible display film have a managed curvature radius without stress to the display film material. Pivot plate 48 and lid pivot 42 retract the flexible display film into the housing for a completely closed unit.

Figure 5:
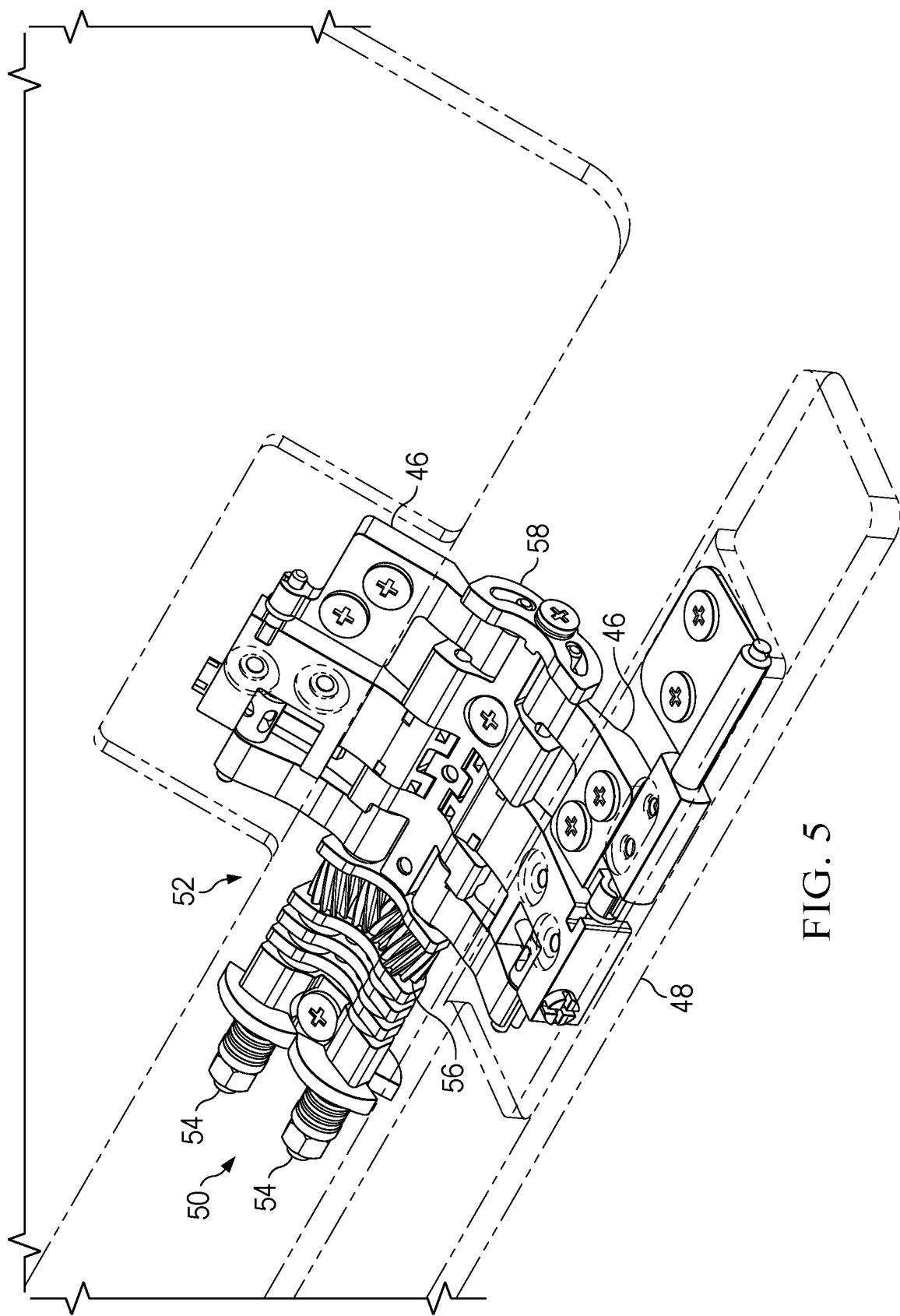
FIG. 5 depicts a detail view of the hinge of FIG. 4.

Referring now to FIG. 5, a detailed view of the hinge of FIG. 4 is depicted. Pivot arm 46 couples pivot plate 48 to hinge body 52 so that rotation of the axles 54 and gears 56 of gear assembly 50 translates into off-axis rotation of pivot plate 48 that accommodates flexible display film curvature. A stop 58 coupled to hinge body 52 and accepting pins of pivot arm 46 in curved slots define the range of rotation of the hinge between a closed position and a maximum open position. In the example embodiment, the maximum open position is 135 degrees.

Figure 6:
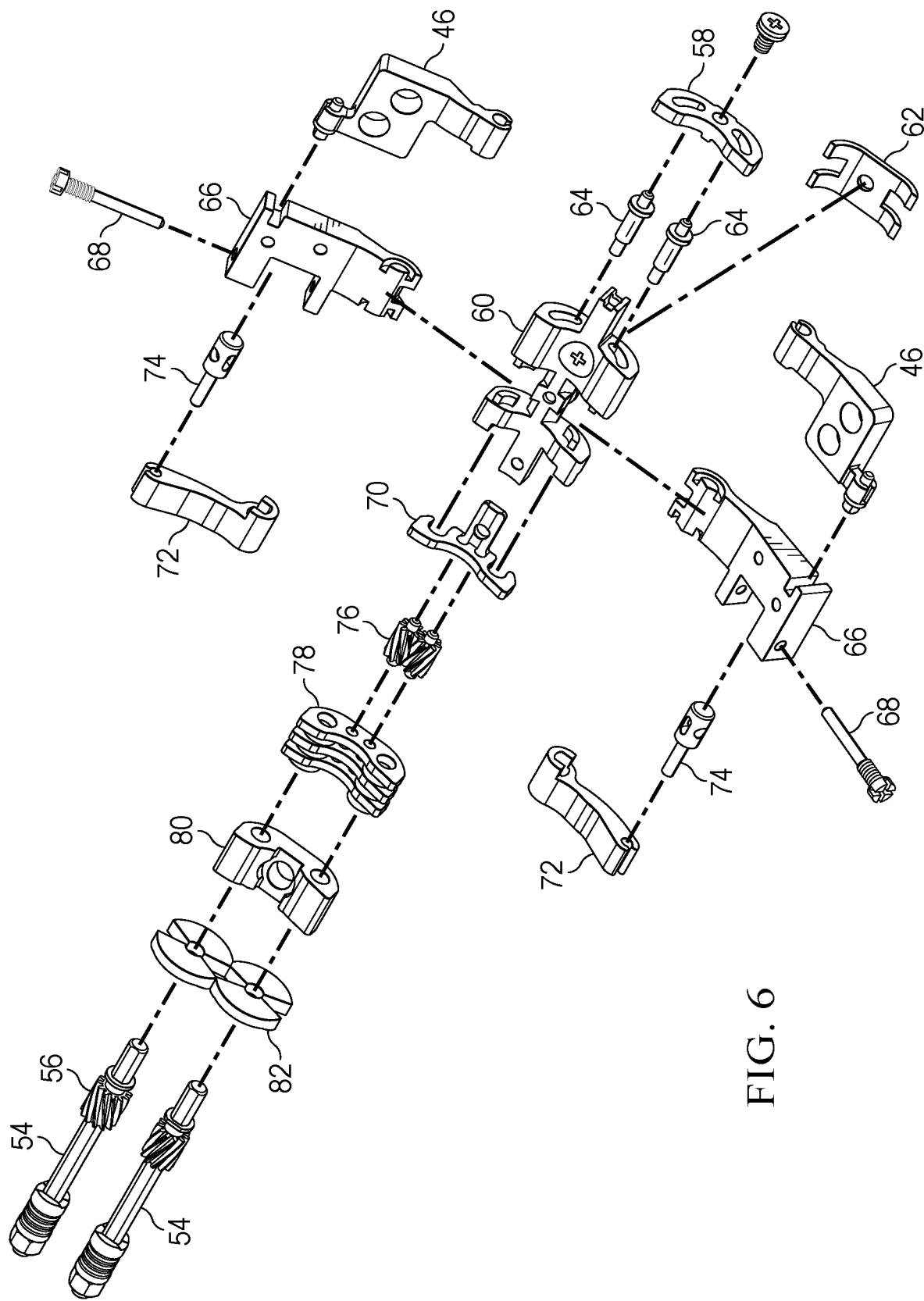
FIG. 6 depicts an exploded view of the hinge of FIG. 4.

Referring now to FIG. 6, an exploded view depicts the hinge. In the example embodiment, a pair of axles 54 each have an axle gear 56 and couple into a torque engine that resists rotation and includes a pair of washers 82, a casing 80 and tensioner 78. The torque engine couples against a gear retainer 70 that maintains engagement of axle gears 56 and transfer gears 76 so that synchronized motion of axles 54 is provided. A main body 60 accepts the end of axles 54 in main bracket arms 66, which couple to opposing lid and main portions of the housing. Coupled to each side of main bracket arm 66 is a pivot arm assembly that translates rotation of axles 54 to a pivot plate for maintaining support of a flexible display film. Pivot arms 46 engage at one end in a vertically aligned slot of main bracket arm 66 and couple at main body 60 with a pin 64 that engages at an exposed end with slots in stop 58. A spring member 62 biases the pivot arm assembly to maintain the pivot plate against the flexible display film. During rotation of axles 54, pivot arms 46 rotate off axis of the axle rotation when main bracket arm 66 moves to work against the pin and slot arrangements at both ends of pivot arm 46. For instance, pins 64 slide along the arc of the guides formed in stop 58 and main body 60 to allow pivot arm 46 to move towards and away from main body 60. Similarly, a pin extending from pivot arm 46 into a slot of main bracket 66 supports vertical movement of pivot arm 46 during rotation of main bracket 66. A main bracket pin 68 passes through main bracket 66 to capture a transfer pin 74 that engages a transfer arm 72. Transfer arm 72 inserts into the end of axle 56 to rotate directly with the axle along with main bracket 66. The relative movement of the pivot arms off axis the rotation of axles 54 is defined by the slot and pin arrangements of the main and pivot arms so that the hinge can be built to support various desired curvatures of movement in an aid to folding of a flexible display film.

Figure 7:
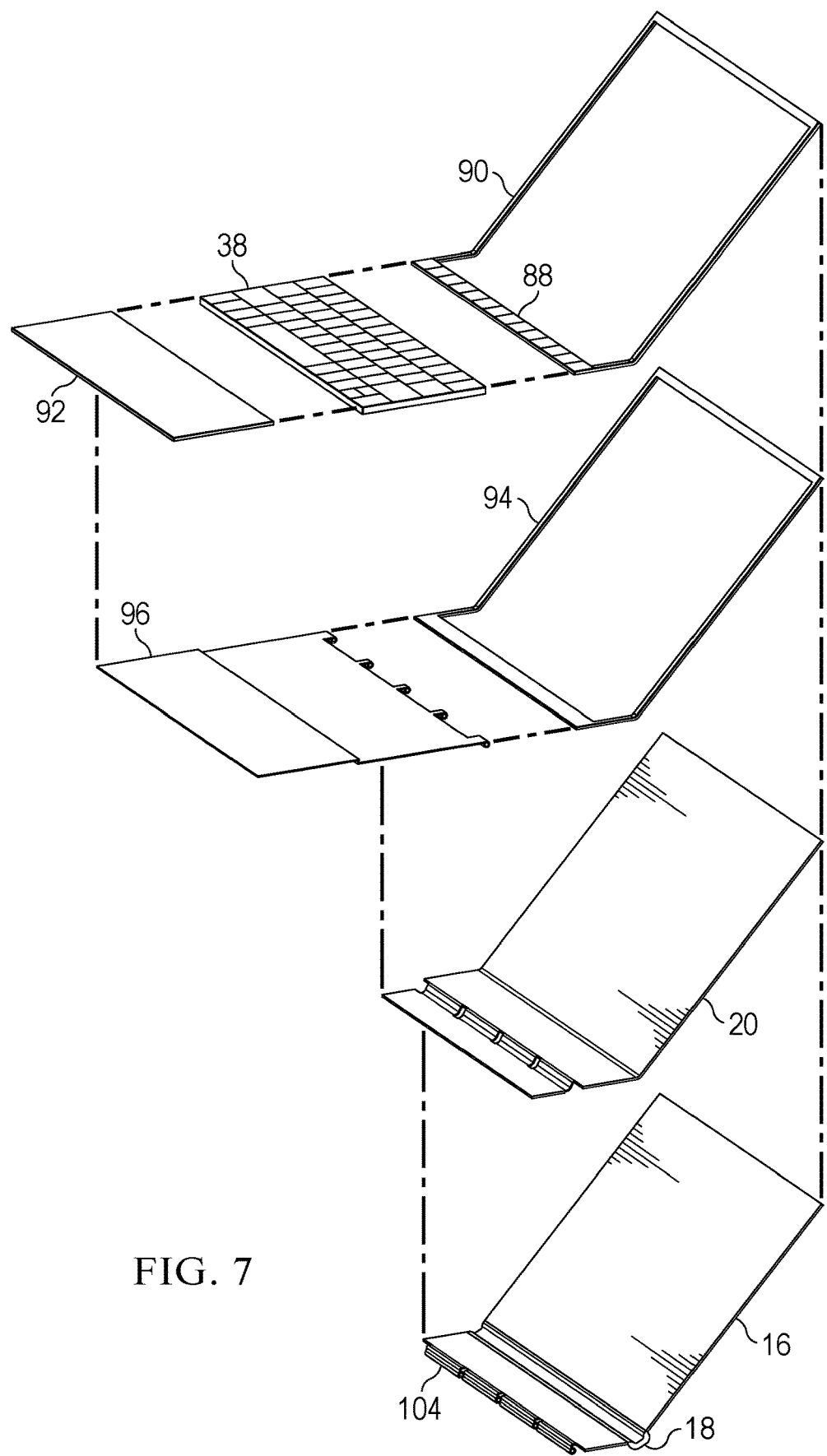
FIG. 7 depicts an exploded perspective view of an example embodiment of a flexible display film partial fold with a touch function row and extra keyboard row.

Referring now to FIG. 7, an exploded perspective view depicts an example embodiment of a flexible display film partial fold with a touch function row and extra keyboard row. In the example embodiment, a bezel 90 includes a fixed row of keyboard keys 88 that having labeling of number keys at the second upper row of a conventional QWERTY keyboard 38. A touch function row is presented adjacent to the number keys on a flexible display film 20 coupled under the bezel. A palm rest 92 couples at the bottom side of keyboard 38. A bezel gasket 94 protects the display film from the bezel and protects against dust and other contaminants. A keyboard and palm rest support 96 holds the keyboard and palm rest at the housing cover portion. Flexible display film 20 presents visual images at substantially all of the surface area of the housing lid portion 16 and folds at the hinge with portion of the display viewing area exposed between the keyboard and the hinge. A midframe 104 and hinge 18 assembly manages the fold of the flexible display film 20, such as the pivot plate and hinge described above. The assembly accepts key inputs with mechanical keys of keyboard 38, number row keys 88 and virtual keys of a touch function row for functions F1 through F9 presented at flexible display film 20. In an alternative embodiment, both the function row of keys and the number row of keys are presented as visual images at the flexible display film.

Figure 8:
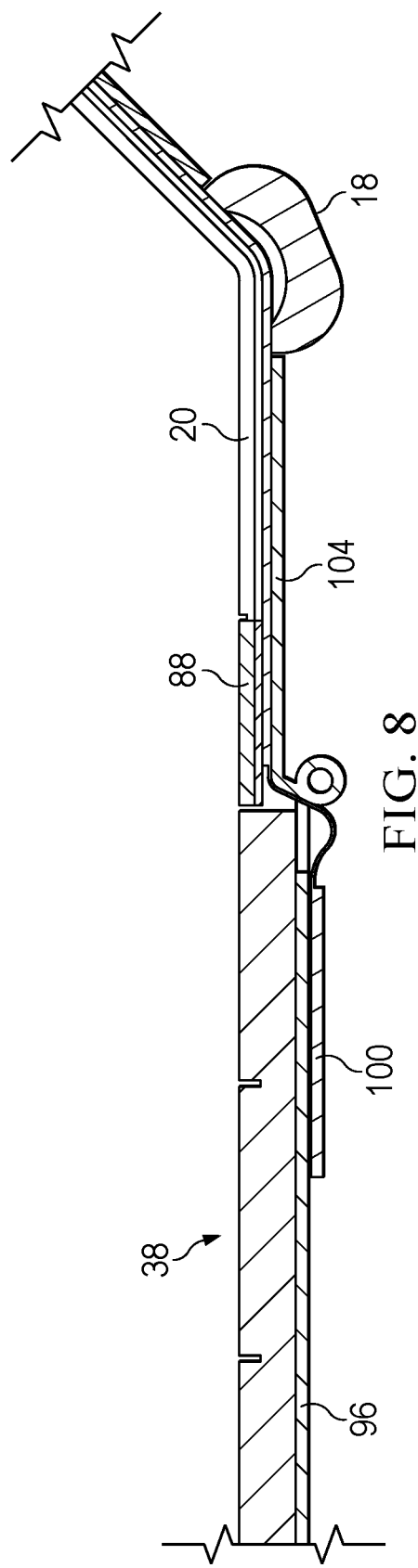
FIG. 8 depicts a side sectional view of the example embodiment of FIG. 7 having a timing controller coupled under a keyboard.

Referring now to FIG. 8, a side sectional view depicts the example embodiment of FIG. 7 having a timing controller 100 coupled under a keyboard 38. As described above, a touch function row of keys F1 through F9 are presented at flexible display film 20 adjacent to number keys 88 and support by midframe 104. The number keys 88 detect input touches with an embedded touch detection surface or, alternatively, with a touch detection surface included in flexible display film 20. Keyboard 38 has mechanical keys that travel vertically to accept inputs at an underlying membrane or other sensor that rest on support 96. A timing controller 100 that distributes visual information to pixels of flexible display film 20 couples below keyboard 38 and interfaces with the motherboard in the housing main portion to receive the visual image information. Placing the timing controller 100 under the mechanical keyboard aids in hiding the wirelines of the display film. The fixed number keys and the virtual touch function row provide full keyboard interface capability in a reduced vertical space so that room within the housing main portion and at hinge 18 is available to support system thermal rejection and other functions.

Figure 9:
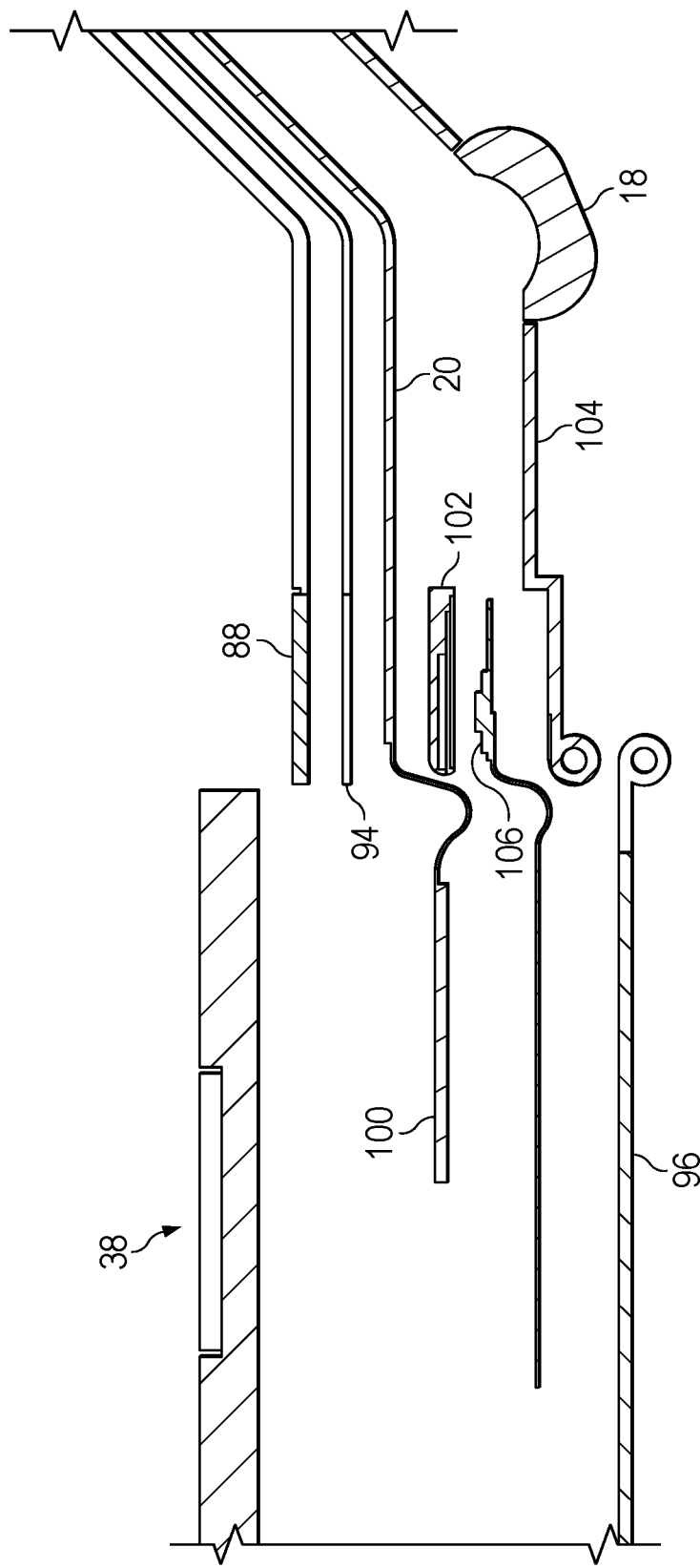
FIG. 9 depicts an exploded sectional view of an example embodiment of the keyboard and flexible display film assembled to accept number key touches with a circuit board under the number keys.

Referring now to FIG. 9, an exploded sectional view depicts an example embodiment of the keyboard and flexible display film assembled to accept number key touches with a circuit board under the number keys. Mechanical keyboard 38 accepts inputs with a vertical depression of keys against keyboard support 96. The number row of keys 88 included in the bezel couple over a Poron gasket 94 and the flexible display film 20. A molded button tree 102 holds the number key row in place and aligned with switches 106 coupled to a printed circuit board that detect presses at the number keys and against midframe support 104. Timing controller 100 couples under keyboard 38 as described above. An end user interacts with number keys 88 with presses detected by the tactile switches 106 and interacts with function keys through function key icons presented at flexible display film 20 adjacent the number keys.

Referring now to FIG. 10, a sectional view depicts the example embodiment of FIG. 9 assembled. In the example embodiment, timing controller 100 is captured below keyboard 38 and interfaced with flexible display film 20 to coordinate presentation of visual information as visual images. A button assembly 110 includes tactile switches on a printed circuit board to detect number key inputs. Midframe support 104 is shaped to accept button assembly 110. Number key input values are accepted with presses at the row of number keys included with the bezel and function key input values are accepted with touches at function key icons presented at flexible display film 20 and detected by a touch detection surface included in flexible display film 20.

Referring now to FIG. 11, a side sectional view depicts an alternative embodiment of a number key detection with a touch detection surface under the number keys. In the example embodiment, keyboard 38 couples over timing controller 100 as described above. Flexible display film 20 presents a touch function row of function icons that have inputs detected by presses at the touch detection surface included in the display film. The number row of keys rest over a touch detection surface 112 (or alternatively a force detection surface) so that presses on the number keys are detected without including switches. The touch detection surface 112 rests directly under the number keys and over the flexible display film. The use of touch detection for number key input detection reduces the vertical height of the keyboard for improved spacing within the housing main portion for thermal rejection and other needs.

Referring now to FIG. 12, a side assembled view of the embodiment of FIG. 11 is depicted having a touch detection surface 112 to detect number key 88 inputs. Keyboard 38 with mechanical keys rests over the timing controller and interface of flexible display film 20. A tack adhesive 114 and 116 holds the touch detection surface 112 in place with underlying supports 96 and 104 supporting the assembly to accept key inputs. In the example embodiment, a variety of alternatives may be used in the place of the touch detection surface, including flexible or hard plastic printed circuit boards that include buttons or switches to detect number key presses and a force detection surface that detects inputs when greater than a predetermined press is detected.

Figure 13:
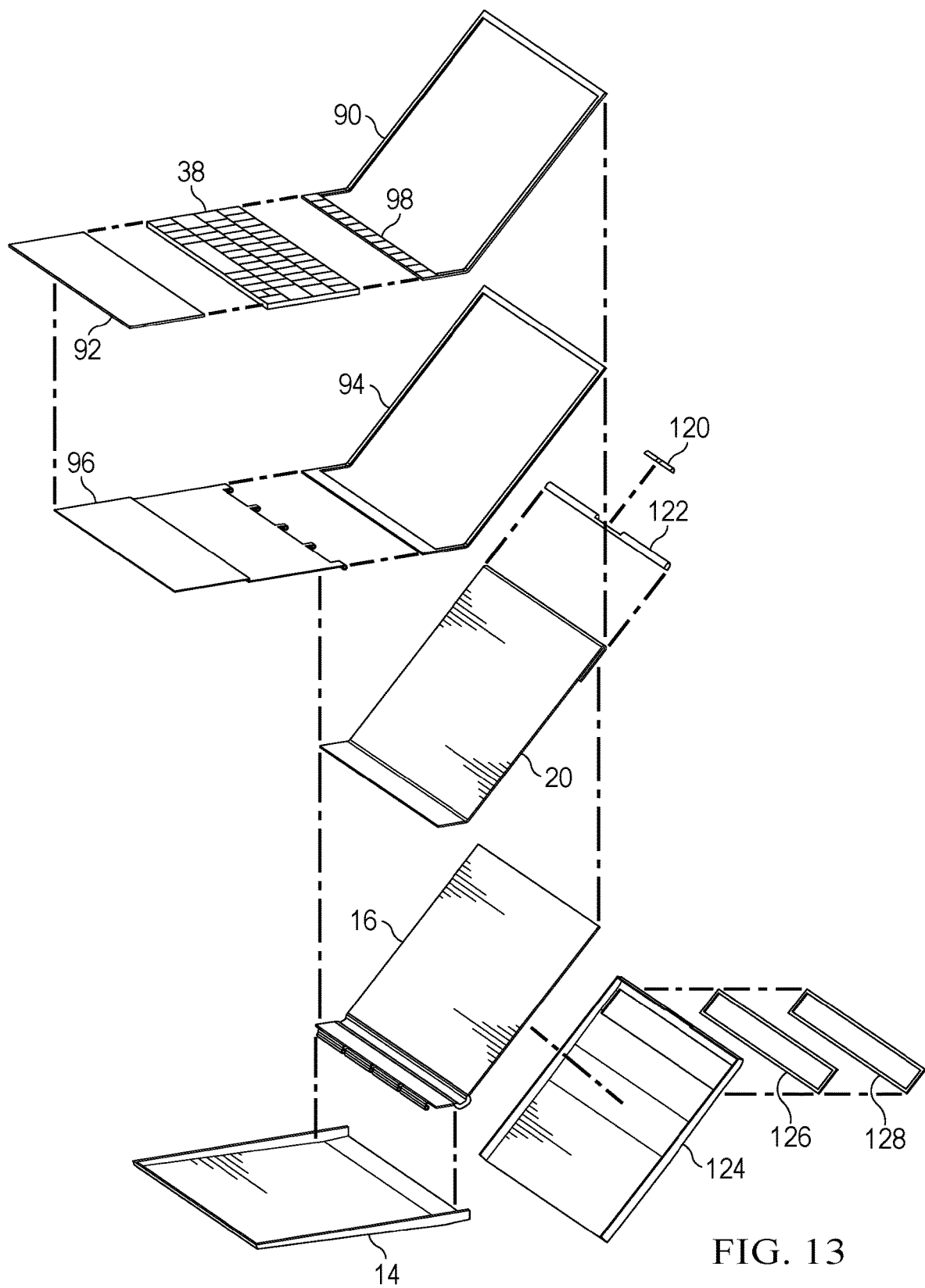
FIG. 13 depicts an alternative embodiment of the flexible display film folded at a top portion of housing lid portion 16 to support notifications at a lid upper and rear surface.

Referring now to FIG. 13, an alternative embodiment depicts the flexible display film 20 folded at a top portion of housing lid portion 16 to support notifications at a lid upper and rear surface. As is described above, a bezel 90 and integrated number key row 88 couple to the system housing main portion 16 adjacent a keyboard 38 and palm rest 92 over a support 96. A housing rear cover 124 couples to lid housing portion 16 at a rear side of flexible display film 20. Flexible display film 20 folds at the rear side of housing lid portion 16 to align with a transparent rear bezel 128 coupled in place at a rear Poron gasket 126. A Poron gasket 94 seals the flexible display film edge with a camera module 120 and light pipe 122 coupling over the end of the housing rear cover 124. Light pipe 122 and rear bezel 128 provide a transparent cover that supports presentation of visual images from flexible display film 20 at the upper edge and rear side of the housing lid portion.

Figure 14:
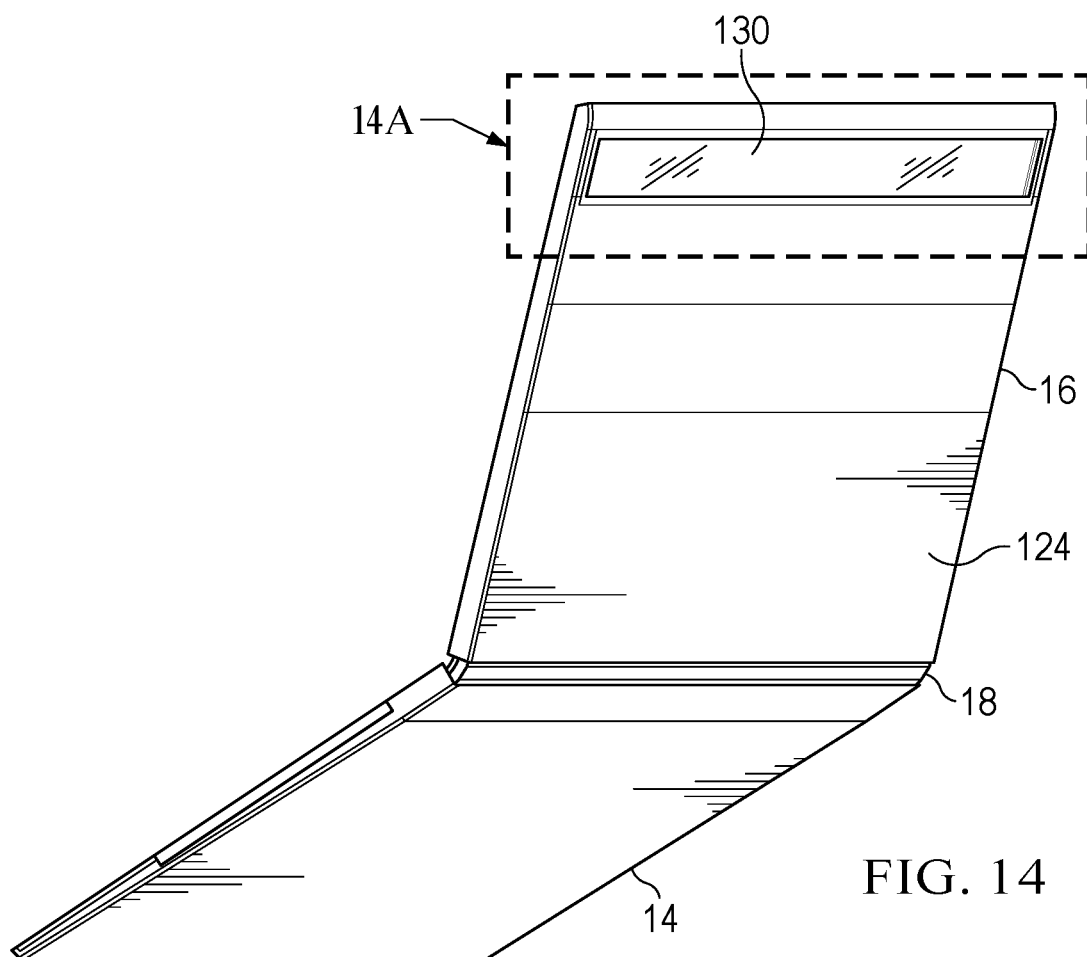
FIGS. 14 and 14A depict a rear side presentation of notifications with the flexible display film folded within the housing lid portion.
Figure 14A:
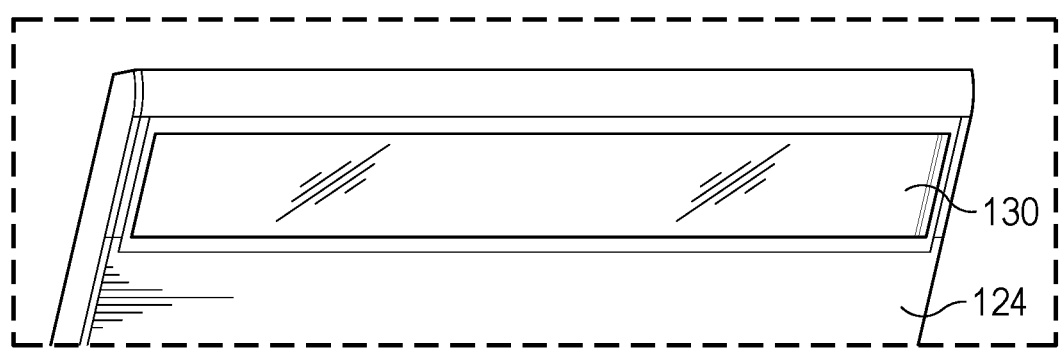

Referring now to FIGS. 14 and 14A, a rear side presentation of notifications with the flexible display film folded within the housing lid portion is depicted. Housing lid portion 16 has rotates about hinge 18 relative to housing main portion 14 to an open position that exposes the flexible display film and mechanical keyboard at the front side. A cover 124 couples at the rear side adjacent a transparent bezel 130 to present visual images at the rear side. FIG. 14A depicts a detailed view that illustrates a window provided by bezel 130 to present visual images from the flexible display film, such as message or other notifications when system is in a closed position.

Figure 15:
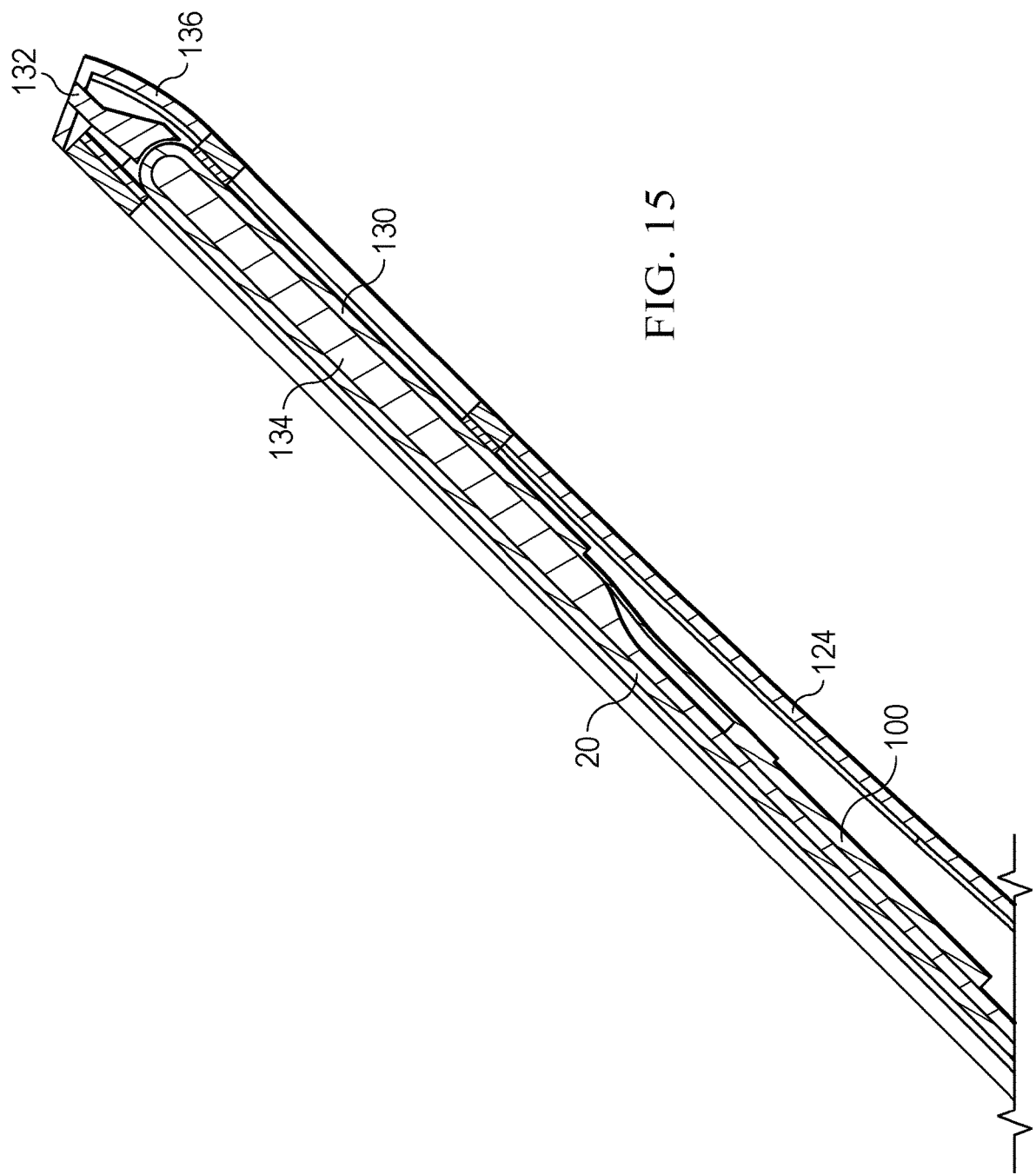
FIG. 15 depicts a sectional side view of the housing lid portion having the flexible display film folded to present notifications at a rear side of the housing.

Referring now to FIG. 15, a sectional side view depicts the housing lid portion having the flexible display film 20 folded to present notifications at a rear side of the housing. Flexible display film 20 folds over a central curved support so that the display film presentation is available through transparent bezel 130. In the example embodiment, timing controller 100 couples to the flexible display film 20 at a rear side of lid portion 16 and is blocked from view by cover 124. Placement of timing controller 100 in the rear side hides display film wirelines that communicate visual information to display film pixels, thereby offering a more aesthetically pleasing solution. At the edge 136 of housing lid portion 16, a lid guide 132 passes light from the display film to the housing exterior so that an indication of different colors is available at the lid edge for notifications to an end user.

Although the present invention has been described in detail, it should be understood that various changes, substitutions and alterations can be made hereto without departing from the spirit and scope of the invention as defined by the appended claims.

What is claimed is:

1. An information handling system comprising:
    a housing having a main portion rotationally coupled to a lid portion by a hinge;
    a processor coupled in the main portion and operable to execute instructions that process information;
    a memory coupled in the main portion and interfaced with the processor, the memory operable to store the instructions and information;
    a keyboard coupled to the main portion and interfaced with the processor, the keyboard having mechanical keys that vertically depress to accept end user inputs;
    a flexible display film coupled to lid portion and extending across the hinge and under the keyboard; and
    a timing controller coupled to the flexible display film under the keyboard and interfaced with the processor, the timing controller communicating the information to the flexible display film for presentation as visual images in the flexible display film in the lid portion and across the hinge by scanning the information to pixels of the display film through wirelines that interface the timing controller and pixels under the keyboard.

2. The information handling system of claim 1 further comprising:
    a non-transitory memory interfaced with the processor; and
    instructions stored in the non-transitory memory that when executed cause:
    presentation of a visual image of a row of plural keys at the flexible display film over the main portion proximate the keyboard; and
    detection of key inputs as presses at the visual image of the row plural keys.

3. The information handling system of claim 2 wherein the presentation of the visual image of the row of plural keys comprises a touch function row having at least keys F1 through F9.

4. The information handling system of claim 2 wherein the presentation of the visual image of the row of plural keys comprises a number row having at least keys 1 through 9.

5. The information handling system of claim 1 further comprising:
    plural keys coupled in a row over the flexible display film at the main portion; and
    a non-transitory memory interfaced with the processor and storing instructions that when executed cause detection of presses on the plural keys as inputs.

6. The information handling system of claim 5 wherein the presses are detected by a capacitive touch surface included with the flexible display film.

7. The information handling system of claim 5 wherein the presses are detected by switches coupled below the plural keys and the flexible display film.

8. The information handling system of claim 5 wherein the presses are detected by a button board coupled under the plural keys and above the flexible display film.

9. The information handling system of claim 5 wherein:
    the plural keys accept number value inputs; and
    the flexible display film presents a touch function row adjacent the plural keys, the touch function row accepting F1 through F9 function value inputs.

10. A method for presenting visual images at an information handling system, the method comprising:
    coupling a flexible display film at a first end to a housing lid portion and at a second end across a hinge to a housing main portion, the display film having plural pixels to present the visual images and wirelines at the second end to communicate visual image information to the plural pixels;
    coupling a timing controller to the flexible display film at the housing main portion, the timing controller interfaced with the wirelines to scan the visual image information through the wirelines to the pixels;
    coupling a mechanical keyboard to the housing main portion over the flexible display film and the timing controller to cover the timing controller and wirelines and hide the timing controller and wirelines under the mechanical keyboard; and
    communicating visual information through the timing controller for presentation at the flexible display film in the housing lid portion and across the hinge.

11. The method of claim 10 further comprising:
    presenting visual images of plural keys at the flexible display film between the mechanical keyboard and hinge at the housing main portion; and
    detecting touches at the visual images of plural keys to accept key value inputs.

12. The method of claim 11 wherein the key value inputs include at least function keys F1 through F9.

13. The method of claim 11 wherein the key value inputs include at least number keys zero through nine.

14. The method of claim 11 further comprising:
    coupling a row of plural keys to the housing main portion over the flexible display film between the hinge and the mechanical keyboard; and
    detecting inputs at the row of plural keys when the keys are depressed.

15. The method of claim 14 wherein the detecting inputs comprises detecting the keys when depressed against a touch detection sensor of the flexible display film.

16. The method of claim 14 wherein the detecting inputs comprises detecting the keys when depressed against switches disposed below the flexible display film.

17. A system for presenting information at a display, the system comprising:
    a mechanical keyboard having mechanical keys that vertically depress to accept end user inputs;
    a flexible display film configured to couple to a housing lid portion and extend across a hinge to a housing main portion and under the mechanical keyboard, the flexible display film having pixels to present visual images at a display area extending from the mechanical keyboard and across the housing lid portion; and
    a timing controller coupled to the flexible display film under the mechanical keyboard, the timing controller communicating the information to the flexible display film for presentation as visual images by scanning pixel values to the pixels across the display area to present visual images across the hinge and at the housing lid portion.

18. The system of claim 17 further comprising:
a non-transitory memory interfaced with the processor; and
instructions stored in the non-transitory memory that when executed cause:
presentation of a visual image of a row of plural keys at the flexible display film over the housing main portion proximate the keyboard; and
detection of key inputs as presses at the visual image of the row of plural keys.

19. The system of claim 18 wherein the row of plural keys comprises a touch function row including at least keys F1 through F9.

20. The system of claim 18 wherein the row of plural keys comprises a number row including at least keys zero through nine.

* * * * *